Aug. 25, 1959     J. R. HARBOTTLE     2,901,092
SPRING ROLLERS OR IDLERS FOR CONVEYOR BELTS
Filed Sept. 9, 1954     3 Sheets-Sheet 1

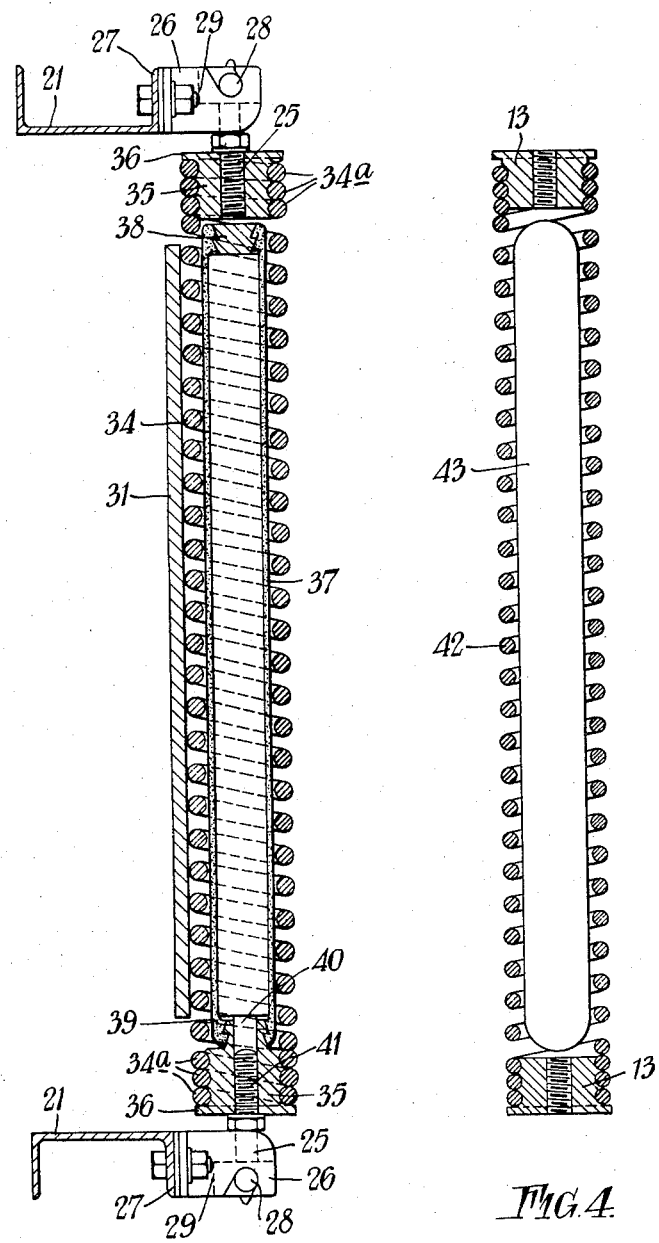

ered Aug. 25, 1959

2,901,092

SPRING ROLLERS OR IDLERS FOR CONVEYOR BELTS

John Russell Harbottle, Claremont, Union of South Africa, assignor to Jonas Woodhead & Sons Limited, Leeds, England, a British company Application September 9, 1954, Serial No. 455,002

Claims priority, application Union of South Africa September 9, 1953

1 Claim. (Cl. 198—192)

This invention relates to spring rollers or idlers for conveyor belts or bands, of the type in which the roller or idler comprises a helical or coiled spring, the end convolutions of which are secured to end plates, or helically-grooved or other hubs, formed with or affixed to spindles which are suspended or mounted in bearings, made preferably so as to permit a limited amount of angular or universal movement of the spindles, so that they are not only free to rotate but also to align themselves with the ends of the roller or idler as it sags under its own weight and according to the weight of the belt or band and the load carried thereby.

Hitherto, in most rollers or idlers of this type, the helical or coiled springs have, under no-load conditions, had their convolutions or coils open or spaced apart. It has, however, been proposed that the spring in its normal or unloaded condition should be closely or tightly coiled with the adjacent convolutions in contact with each other, it being thereby sought to obtain greater rigidity of the roller. In addition, it has been proposed to manufacture the rollers with springs which are not only so wound that the convolutions in the unloaded condition will touch or lie in contact with each other, but also be under an axial stress, which is produced in the spring when it is being wound or manufactured by causing the spring wire during winding to lag a little at the winding-on position, so that a convolution of wire is forced under tension into its position beside the convolution of wire last completed.

The principal object of the invention is to provide spring rollers or idlers which, consistently with their being light in weight and highly resilient, will have a greater inherent rigidity and greater resistance to deflection under load than spring rollers or idlers hitherto made or proposed.

Other objects of the invention are to provide a simple and inexpensive method of imparting the aforesaid inherent rigidity and enhanced resistance to the springs of the rollers or idlers in the course of their being wound or manufactured, and to provide means for self-cleaning or preventing clogging with dirt of the said spring rollers or idlers and/or other spring rollers or idlers (for example, open coil rollers or idlers for supporting the return stretch of the belt or band) in conjunction with which they may be used.

According to one of the features of the invention, a spring roller or idler for a conveyor belt or band is provided comprising a helical or coiled spring which is made out of spring wire which, during its formation into the helical or coiled state, is subjected to both a tensile stress in the direction of the axis of the wire, and a twisting stress about the axis of wire, so as to cause the coils or convolutions of the spring, as a result of the bending stress and reactive torque thereby produced in the wire, to become prestressed radially and axially together.

According to another feature of the invention, an effective and simple method of producing a prestressed spring roller or idler as aforesaid is provided, in which the wire to form the spring is wound helically in juxtaposed or contacting coils or convolutions on a rotating mandrel or the like, and in which at the same time the wire, in advance of its winding-on position, has imparted thereto a tensile stress adapted to produce a bending prestress in the wire directed inwards towards the axis of the coils, and a twisting stress adapted to produce a reactive torque in the wire so as to cause the coils in the direction of their axis to be precompressed together.

According to a further feature of the invention, there is provided a roller or idler system for a conveyor belt or band in which the rollers or idlers for the loaded or upper stretch of the belt or band comprise a number of the prestressed spring rollers or idlers as previously described, and in which the rollers or idlers for the return or lower stretch of the belt or band comprise a number of spring rollers or idlers having the coils of the springs open or spaced apart.

The invention will now be described, by way of example, with reference to the accompanying drawings, in which:

Figure 3 is a half-sectional view of a modified open-coil or return roller and its mountings; and Figure 4 is a half-sectional view of a further modified form of open-coil roller, without its spindles and the mountings therefor.

Figure 1:
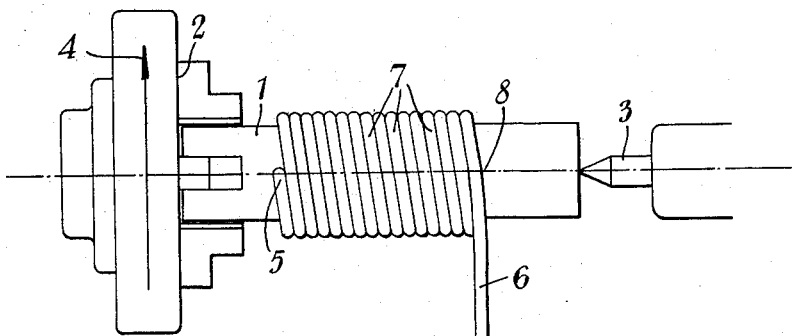
Figure 1 is a diagrammatic view of a rotating mandrel apparatus illustrating the improved method of winding and prestressing the springs of the rollers or idlers.
Figure 1:
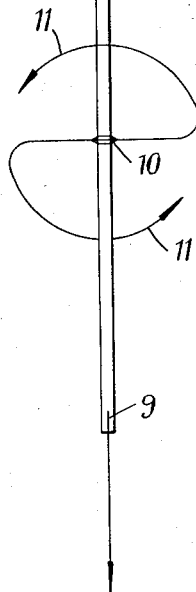

The reference numeral 1 denotes the mandrel on which the springs for the prestressed rollers are to be wound, such mandrel 1 being gripped coaxially at its left-hand end in a rotatable headstock 2 of a lathe or turning machine, and rotatably supported at its right-hand end by the coaxial tailstock 3. As shown by the arrow 4, the mandrel 1 is adapted to be rotated by the headstock 2 in an anti-clockwise direction (viewing the mandrel in the direction from left to right).

The leading end 5 of the spring wire 6 is attached to the mandrel 1 adjacent to the left-hand end thereof (as, for example, by being inserted through a diametrical hole in the mandrel) so as to be carried round therewith. The spring wire 6, whether it is of spring steel, stainless steel, Phosphor bronze or other suitable metal, is of a hard-drawn quality capable of being prestressed for the purposes of the invention, and is also sufficiently ductile to be coiled in the cold state without risk or undue strain or fracture.

In the example illustrated, the coiling of the wire 6 is commenced at the left-hand end of the mandrel 1 and is carried on from that end towards the right-hand end supported by the tailstock 3 in coils 7 constituting a clockwise helix (looking along the mandrel from left to right).

As the winding of the wire 6 thus proceeds on the mandrel 1, the wire 6 is subjected to a tensile stress in the direction of its axis, this stress being imparted to the wire, in advance of its winding-on position 8 by means (not shown) exerting an axial pull or restraint on the wire at the end or position marked by the arrow 9. Simultaneously, the wire 6 is subjected to a twist or torque which is applied thereto by means (not shown) applied at the position 10 and which is imparted to the wire in an anti-clockwise direction (looking along the wire in the direction of movement thereof on to the mandrel 1) as denoted by the arcuate arrows 11.

The aforesaid tensile stress automatically produces in the wire, as coiled on the mandrel 1, a bending prestress, which causes the coils 7 on removal of the finished spring from the mandrel, to become precompressed or contracted together radially. The twist or torque, on the other hand, automatically provides in the wire as coiled on the mandrel 1, a reactive torque which causes the coils 7 of the spring to be precompressed together in the direction of the axis of the spring.

Preferably, the degree of tensile stress, and of twist or torsional stress, applied to the wire is limited in respect of any given gauge and material of wire to magnitude within one-quarter of the tensile breaking stress, and torsional breaking stress, respectively, of the wire.

As will be appreciated, the improved method of prestressing may be applied to the manufacture not only of right-hand springs as above described, but also of left-hand springs. For example, in winding a left-hand spring with the apparatus indicated in Figure 1, the coils 7 will be wound on the mandrel 1 from right to left in an anti-clockwise helix (looking along the mandrel from right to left) and the direction of twist (looking in the direction of movement of the wire 6 on to the mandrel) will be clockwise.

In the case of any particular type of spring roller, the degree of deflection under a given loading will vary in proportion to the magnitude of the tensile and torsional prestresses applied, and it is possible therefore, with the aid of the invention, to manufacture spring rollers of a predetermined inherent rigidity corresponding to a desired degree of deflection under load.

Figure 2:
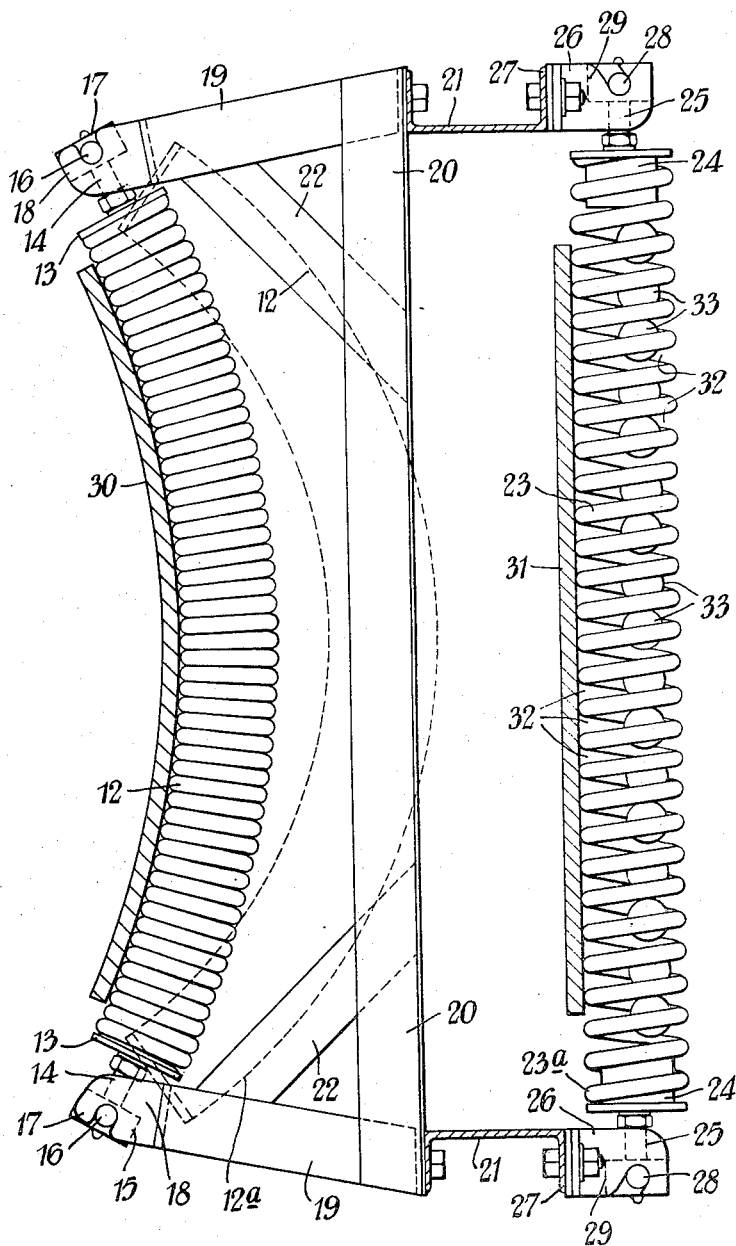
Figure 2 is a cross-sectional view of a belt or band conveyor illustrating in elevation an assembly of prestressed and open-coil rollers for the loaded and return stretches, respectively, of the belt or band.

Referring to Figure 2:

The reference numeral 12 denotes a spring roller or idler produced as above-described, or otherwise wound and prestressed in accordance with the invention. The end convolutions of the spring 12 are secured to helically-grooved or other hubs or end plates 13, in which are screwed or otherwise fixed outwardly-extending coaxial spindles 14.

The spindles 14 are rotatably mounted in, and suspended from, bearing casings 15, each of which is provided at diametrically opposite sides with projecting pins 16. The pins 16 are hingeably supported in recesses 17 formed in the opposite jaws of bifurcated supports 18 mounted on stands or trestles 19. At their base, these stands or trestles 19 are bolted, riveted or otherwise firmly secured to the adjacent cross-beam 20 and longitudinal beam 21 of the conveyor frame. For reinforcement or stiffening purposes, a strut or gusset 22 is provided between the end of the cross-beam 20 and each leg of the adjacent stand or trestle 19, the space between these struts or gussets and the legs of the stands being sufficient to allow the end plates 13 and end portions of the spring roller 12 to move freely between the same when the roller is deflected under load (see dotted lines 12a in Figure 2).

Directly below, and in the same plane as, the prestressed or upper roller 12, a lower roller 23 is provided. This roller 23 is an open-coil roller, not having tensile and/or torsional prestressing applied thereto, and has its end convolutions secured to hubs or end plates 24. Spindles 25 are fitted to these hubs or end plates 24, in similar manner to that already described with reference to the spindles 14 and hubs or end plates 13 of the upper roller 12. Bifurcated hangers or supports 26 are bolted, riveted or otherwise secured to the bottom flanges 27 of the longitudinal beams 21. The spindles 25 are hingeably and rotatably suspended and mounted in the hangers 27 by means of pins 28 and bearing casings 29 similar to the pins 16 and bearing casings 15 of the upper roller 12.

The conveyor frame constituted by the longitudinal beams 21 and cross beams 20 is supported at intervals by posts or stanchions (not shown) riveted or otherwise secured to the longitudinal beams 21 and resting on or fixed to the floor or ground. The frame extends along the length of the conveyor, and assemblies of the upper and lower rollers 12, 23 as above-described are provided at more or less regular intervals.

The upper or prestressed rollers 12 carry the loaded or upper stretch 30 of the belt or band, and the lower rollers 23 carry the return or lower stretch 31. The supports 18 are spaced at such a distance apart that, when the upper rollers 12 are mounted in these supports and carry the band 30 in unloaded condition, the rollers 12 become deflected so that the band 30 in cross-section is of a shallow troughed formation (as shown in full lines in Figure 2). According to the weight of material loaded on the upper stretch 30, the deflection or curvature of its troughed formation increases more or less, corresponding to the consequently greater loading and deflection of the upper rollers 12. By reason of the prestressing, as aforesaid, of these rollers, however, the amount of increase of their deflection per unit increase of load is relatively smaller than in the case of other rollers hitherto proposed or used under similar conditions.

The hangers 26 are spaced at such a distance apart that, when the lower or open-coil rollers 23 are mounted in these hangers and carry the return or lower stretch 31 of the band, the surface of the band across the stretch 31 is uniformly or substantially flat. As will be appreciated, the surface of the lower stretch 31 in contact with the roller 23 is the surface which (being uppermost as the band travels on the upper rollers 12) becomes coated with adherent dirt, grease or grit due to the materials carried by the band. This load-carrying surface, as the band returns on the return rollers 23, becomes scraped clean from such adherent dirt or other matter by the rotating, inclined convolution-surfaces of the coils of the rollers 23. The matter so removed falls through or into the openings or spaces 32 between the coils.

By reason of the open formation of the lower rollers 23, dirt or solid matter entering into or between the coils is ejected or escapes with ease. In order, however, to prevent or minimise by positive means any clogging or accumulation of foreign matter (more particularly moist or greasy matter) within or between the coils, loose balls 33 or like bodies may be inserted within the rollers, so that, by the said bodies being tumbled about in the rollers during rotation, the adherent or trapped matter is dislodged and forced out of the rollers. Similar bodies may also be used as a safe-guard against clogging in the upper rollers 12.

Referring to Figure 3:

The lower or open-coil roller 34 shown in this figure is similar in general construction and mounting to the lower roller 23 shown in Figure 2, and similar reference numerals in these figures denote similar parts. Whereas in the case of the above-described roller 23 (Figure 2), however, the end convolutions 23a of the spring are welded to the hubs or end plates 13, the end convolutions 34a of the roller 34 (Figure 3) are compressed solidly together, and the hubs 35 are helically-grooved so that they can be screwed therein until abutment takes place between the collar or shoulder 36 and the end of the spring.

The roller 34 also embodies a modified means of preventing or minimising the clogging or filling with dirt of the interior of the spring, this means comprising a water-filled tube composed of a length of rubber hose 37 having a solid closure plug 38 cemented in one end thereof and a filling plug 39 cemented in the other end. An axial passage 40 in the filling plug 39 lies adjacent to, and in alignment with the screw-threaded bore 41 of the adjacent hub 35. By unscrewing the screw-threaded spindle 25 from the bore 41, water under pressure can be introduced through the bore 41 and passage 40 into the interior of the hose 37. When filling of such interior with the water is complete, the spindle 25 is again screwed into the bore 41 and its inner end acts as a stopper to close the passage 40 and retain the water in the hose 37. The water-filled hose presses outwardly against the coils of the spring roller 34 and seals the interior of the roller against entry or accumulation of dirt.

Referring to Figure 4:

The lower roller 42 shown in this figure comprises an open coil spring fitted with helically-grooved end plates or hubs 13 and is in other respects similar to the roller 34 shown in Figure 3, except that, in lieu of a water-filled tube, an air-inflated or solid sponge rubber insert 43 is arranged inside the roller in order to prevent or minimise the clogging as aforesaid of the coils.

Water-filled, air-inflated, or like tubes or bodies, or sponge rubber or like elastic inserts may also be used for anti-clogging purposes in the upper or pre-stressed rollers 12 (Figure 2).

Various modifications may be made in the rollers or idlers herein described, without departing from the scope of the invention. For example, two or more prestressed springs as herein specified may be used in combination to constitute a spring roller or idler, one such spring being arranged, for instance, co-axially within another such spring, and the one being, if desired, a right-hand coiled spring, and the other a left-hand coiled spring.

Whilst the invention has been described herein as applied to spring rollers or idlers arranged with their axes extending directly across, that is, at right angles to, the direction or line of travel of the belt or band, it is to be understood that it may be applied to spring rollers or idlers arranged with their axes at an inclination to the said direction or line of travel so that the parts of the convolutions of the springs which are in contact at any time with the belt or band are directly in line with or substantially parallel to the line of travel of the belt or band, as specified in my co-pending patent application Serial No. 457,377, now abandoned.

In carrying out the present invention, also, spring rollers or idlers may be used in which the end plates, hubs or like members to which the end convolutions of the springs are attached or fitted are mounted on their respective spindles so as to be capable of being adjusted to, and held for operation in, different axial positions thereon.

I claim:

A spring roller for use in resiliently supporting an endless conveyor belt on a frame of a material conveying system comprising a coiled wire having a plurality of convolutions, said wire being tensionally stressed along the axis thereof and torsionally stressed about the axis thereof in a predetermined direction so that said convolutions are urged both radially and axially together.

References Cited in the file of this patent

UNITED STATES PATENTS

| | | |
|---|---|---|
| 857,610 | Dull | June 25, 1907 |
| 1,355,587 | Baldwin | Oct. 12, 1920 |
| 1,804,705 | Paulus et al. | May 12, 1931 |
| 2,087,813 | Peterson | July 20, 1937 |
| 2,157,301 | Neuman | May 9, 1939 |
| 2,613,802 | Chapman | Oct. 14, 1952 |
| 2,647,619 | Green | Aug. 4, 1953 |

FOREIGN PATENTS

| | | |
|---|---|---|
| 496,987 | Great Britain | Dec. 9, 1938 |

OTHER REFERENCES

Text: "Mechanical Springs" by A. M. Wahl (1st edition), pages 193 and 197 relied upon as reference.